United States Patent
Deng

(10) Patent No.: US 8,989,594 B2
(45) Date of Patent: Mar. 24, 2015

(54) METHOD AND DEVICE FOR ADJUSTING FILTERING BANDWIDTH OF AN OPTICAL DEVICE

(71) Applicant: Huawei Technologies Co., Ltd., Shenzhen, Guangdong (CN)

(72) Inventor: Ning Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 13/793,928

(22) Filed: Mar. 11, 2013

(65) Prior Publication Data

US 2013/0188957 A1    Jul. 25, 2013

Related U.S. Application Data

(63) Continuation of application No. PCT/CN2011/077488, filed on Jul. 22, 2011.

(51) Int. Cl.
| | |
|---|---|
| *H04B 10/00* | (2013.01) |
| *H04B 10/516* | (2013.01) |
| *H04B 10/50* | (2013.01) |
| *H04J 14/02* | (2006.01) |

(52) U.S. Cl.
CPC ............ *H04B 10/516* (2013.01); *H04B 10/506* (2013.01); *H04J 14/0221* (2013.01)
USPC ............................. 398/158; 398/182; 398/192

(58) Field of Classification Search
CPC ........................................................ H04B 10/00
USPC ........................... 398/140, 158, 182, 192–198
See application file for complete search history.

(56) References Cited

U.S. PATENT DOCUMENTS

| | | | | |
|---|---|---|---|---|
| 5,140,656 | A | * | 8/1992 | Hasegawa et al. ............... 385/24 |
| H1702 | H | * | 1/1998 | Esman et al. .................. 398/201 |
| 8,412,039 | B2 | * | 4/2013 | Zaacks ............................ 398/25 |
| 2003/0174659 | A1 | * | 9/2003 | Handelman ................... 370/280 |

(Continued)

FOREIGN PATENT DOCUMENTS

| | | |
|---|---|---|
| CN | 101366208 A | 2/2009 |
| CN | 101605276 A | 12/2009 |

(Continued)

OTHER PUBLICATIONS

Search Report dated May 14, 2013 in connection with Chinese Patent Application No. 201180001313.3.

(Continued)

*Primary Examiner* — Agustin Bello

(57) ABSTRACT

A method for adjusting a filtering bandwidth of an optical device includes: acquiring a modulation bandwidth of a first optical signal and s modulation bandwidth of a second optical signal, where the first optical signal is an optical signal input into a first wavelength channel of an optical device, the second optical signal is an optical signal input into a second wavelength channel of the optical device, and the second wavelength channel is adjacent to the first wavelength channel; comparing the modulation bandwidth of the first optical signal with the modulation bandwidth of the second optical signal; and according to a result of comparing the modulation bandwidth of the first optical signal with the modulation bandwidth of the second optical signal, adjusting a filtering bandwidth of at least one wavelength channel of the first wavelength channel and the second wavelength channel.

14 Claims, 4 Drawing Sheets

(56) References Cited

U.S. PATENT DOCUMENTS

| | | | |
|---|---|---|---|
| 2004/0013435 A1* | 1/2004 | Eiselt et al. | 398/140 |
| 2004/0076360 A1* | 4/2004 | Chen et al. | 385/14 |
| 2006/0140632 A1* | 6/2006 | Mohs et al. | 398/85 |
| 2006/0276147 A1* | 12/2006 | Suzuki et al. | 455/114.3 |
| 2007/0183781 A1 | 8/2007 | Zeng | |
| 2008/0144177 A1* | 6/2008 | Miller | 359/498 |
| 2008/0193143 A1* | 8/2008 | Mahgerefteh et al. | 398/183 |
| 2009/0097849 A1 | 4/2009 | Childers et al. | |
| 2009/0264089 A1* | 10/2009 | Suzuki et al. | 455/114.3 |
| 2010/0054750 A1 | 3/2010 | Forgheri et al. | |
| 2010/0067843 A1 | 3/2010 | Little | |
| 2010/0290779 A1* | 11/2010 | Zaacks | 398/25 |
| 2011/0019785 A1* | 1/2011 | Cowley et al. | 375/350 |
| 2011/0135314 A1* | 6/2011 | Tolstikhin et al. | 398/149 |
| 2012/0224851 A1* | 9/2012 | Takara et al. | 398/45 |
| 2012/0263461 A1* | 10/2012 | Lowery et al. | 398/38 |
| 2013/0188957 A1* | 7/2013 | Deng | 398/79 |
| 2013/0266320 A1* | 10/2013 | Kai et al. | 398/79 |

FOREIGN PATENT DOCUMENTS

| | | |
|---|---|---|
| CN | 101846815 A | 9/2010 |
| WO | WO 99/57834 A1 | 11/1999 |
| WO | WO 02/13433 A2 | 2/2002 |
| WO | WO 2010/022327 A2 | 2/2010 |

OTHER PUBLICATIONS

International Search Report dated Apr. 26, 2012 in connection with International Patent Application No. PCT/CN2011/077488.

* cited by examiner

US 8,989,594 B2

METHOD AND DEVICE FOR ADJUSTING FILTERING BANDWIDTH OF AN OPTICAL DEVICE

CROSS-REFERENCE TO RELATED APPLICATIONS

This application is a continuation of International Application No. PCT/CN2011/077488, filed on Jul. 22, 2011, which is hereby incorporated by reference in its entirety.

TECHNICAL FIELD

Embodiments of the present invention relate to the field of optical communication networks, and in particular, to a method and a device for adjusting filtering bandwidth of an optical device.

BACKGROUND

In a wavelength division multiplexing (Wavelength Division Multiplexing, WDM) optical network, a large number of optical devices, that is, WDM optical devices, for merging, decomposing, and cross-connecting a plurality of wavelength channels in various manners need to be used, for example, a wavelength selective switch (Wavelength Selective Switch, WSS), an optical cross-connect (Optical Cross-Connect, OXC), a wavelength multiplexer (Multiplexer, MUX), a wavelength demultiplexer (Demultiplexer, DEMUX), an optical add-drop multiplexer (OADM, Optical Add-Drop Multiplexer), a reconfigurable optical add-drop multiplexer (ROADM, Reconfigurable Optical Add-Drop Multiplexer). However, channel intervals of each of the optical devices with a plurality of wavelength channels are all the same, and filtering bandwidth of each wavelength channel of the optical device is fixed.

The prior art has the following defects:

With the development of the technology, each wavelength channel of the WDM optical devices needs to transmit optical signals with different rates (such as 10 Gb/s, 40 Gb/s, and 100 Gb/s) and different modulation formats (for example, binary on-off keying (On-Off Keying, OOK), optical duo-binary (Optical Duo-Binary, ODB), differential phase shift keying (Differential Phase Shift Keying, DPSK), quadrature phase shift keying (Quadrature Phase Shift Keying, QPSK), polarization division multiplexing (Polarization Division Multiplexing, PDM)-quadrature phase shift keying (Quadrature Phase Shift Keying, QPSK), and quadrature amplitude modulation (QAM, Quadrature Amplitude Modulation)). The optical signals with different rates and different modulation formats have different modulation bandwidth. However, in the prior art, the filtering bandwidth of the WDM optical device cannot be dynamically adjusted based on modulation bandwidth of input signals.

SUMMARY

Embodiments of the present invention provide a method and a device for adjusting filtering bandwidth of an optical device, so as to adjust filtering bandwidth of a wavelength channel of the optical device.

Accordingly, embodiments of the present invention provide the following:

A method for adjusting filtering bandwidth of an optical device includes:

acquiring modulation bandwidth of a first optical signal and modulation bandwidth of a second optical signal, where the first optical signal is an optical signal input into a first wavelength channel of an optical device, the second optical signal is an optical signal input into a second wavelength channel of the optical device, and the second wavelength channel is adjacent to the first wavelength channel;

comparing the modulation bandwidth of the first optical signal with the modulation bandwidth of the second optical signal; and according to a result of comparing the modulation bandwidth of the first optical signal with the modulation bandwidth of the second optical signal, adjusting filtering bandwidth of at least one wavelength channel of the first wavelength channel and the second wavelength channel.

A device for adjusting filtering bandwidth of an optical device includes:

a modulation bandwidth acquisition unit, configured to acquire modulation bandwidth of a first optical signal and modulation bandwidth of a second optical signal, where the first optical signal is an optical signal input into a first wavelength channel of an optical device, the second optical signal is an optical signal input into a second wavelength channel of the optical device, and the second wavelength channel is adjacent to the first wavelength channel;

a first comparison unit, configured to compare the modulation bandwidth of the first optical signal with the modulation bandwidth of the second optical signal; and an adjustment unit, configured to: according to a result of comparing the modulation bandwidth of the first optical signal with the modulation bandwidth of the second optical signal, adjust filtering bandwidth of at least one wavelength channel of the first wavelength channel and the second wavelength channel.

In the embodiments of the present invention, modulation bandwidth of optical signals input into adjacent wavelength channels of the optical device are compared, and filtering bandwidth of at least one wavelength channel of the adjacent wavelength channels is adjusted according to a comparison result, so that the filtering bandwidth of the wavelength channels of the optical device can be dynamically adjusted based on the modulation bandwidth of received optical signals.

DETAILED DESCRIPTION

The following embodiments of the present invention provide a method and a device for adjusting filtering bandwidth of an optical device, where filtering bandwidth of at least one wavelength channel of adjacent wavelength channels can be adjusted by comparing modulation bandwidth of optical signals received by the adjacent wavelength channels of the optical device, so that the filtering bandwidth of the optical device can be dynamically adjusted based on modulation bandwidth of input signals.

Figure 1:
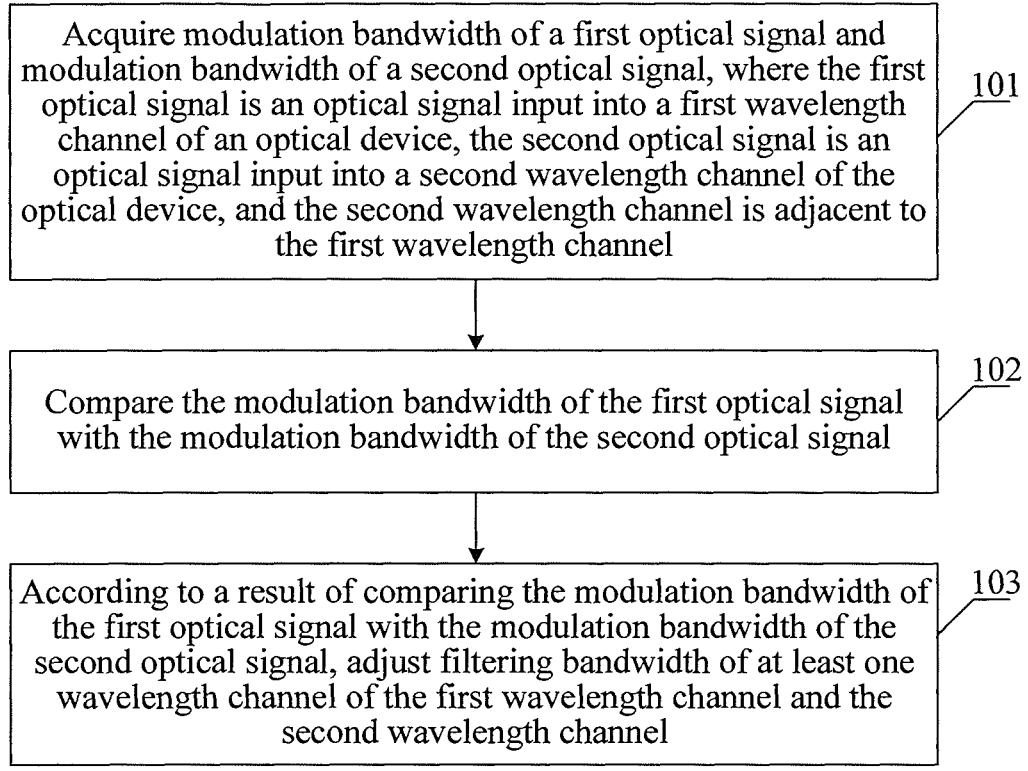
FIG. 1 is a flow chart of a method for adjusting filtering bandwidth of an optical device provided by an embodiment of the present invention.

Referring to FIG. 1, an embodiment of the present invention provides a method for adjusting filtering bandwidth of an optical device. The method includes:

101: Acquire modulation bandwidth of a first optical signal and modulation bandwidth of a second optical signal, where the first optical signal is an optical signal input into a first wavelength channel of an optical device, the second optical signal is an optical signal input into a second wavelength channel of the optical device, and the second wavelength channel is adjacent to the first wavelength channel.

Each step of the embodiment of the present invention is executed by a WDM network control apparatus.

The optical device in the embodiment of the present invention is an optical device with a plurality of wavelength channels and may be a WDM optical device. In the embodiment of the present invention, channel intervals of the WDM optical device are the same. For example, the channel intervals are 50 GHz or 100 GHz.

The acquiring the modulation bandwidth of the first optical signal and the modulation bandwidth of the second optical signal may specifically adopt the following manners:

First manner: Acquire information of the first optical signal and information of the second optical signal from a WDM network management apparatus, where the information of the first optical signal includes a baud rate, a bit rate, and a modulation format of the first optical signal, and the information of the second optical signal includes a baud rate, a bit rate, and a modulation format of the second optical signal; calculate the modulation bandwidth of the first optical signal according to the information of the first optical signal; and calculate the modulation bandwidth of the second optical signal according to the information of the second optical signal.

Second manner: Acquire the modulation bandwidth of the first optical signal and the modulation bandwidth of the second optical signal from a WDM network management apparatus. In this case, the WDM network management apparatus calculates the modulation bandwidth of the first optical signal according to information of the first optical signal and calculates the modulation bandwidth of the second optical signal according to information of the second optical signal, and then sends the modulation bandwidth of the first optical signal and the modulation bandwidth of the second optical signal to the WDM network control apparatus.

102: Compare the modulation bandwidth of the first optical signal with the modulation bandwidth of the second optical signal.

103: According to a result of comparing the modulation bandwidth of the first optical signal with the modulation bandwidth of the second optical signal, adjust filtering bandwidth of at least one wavelength channel of the first wavelength channel and the second wavelength channel.

The adjusting the filtering bandwidth of the first wavelength channel and the second wavelength channel may be adjusting 3 dB filtering bandwidth of the first wavelength channel and the second wavelength channel, or adjusting non-3 dB filtering bandwidth, for example, 0.5 dB filtering bandwidth, of the first wavelength channel and/or the second wavelength channel. In this case, if the filtering bandwidth is increased, it is equivalent to that a top of a filtering waveform becomes flatter; if the filtering bandwidth is decreased, it is equivalent to that the top of the filtering waveform becomes steeper. If the 3 dB filtering bandwidth of the first wavelength channel and the second wavelength channel are adjusted, bandwidth of one wavelength channel of the first wavelength channel and the second wavelength channel is increased, and bandwidth of the other wavelength channel is decreased.

The adjusting the filtering bandwidth of the first wavelength channel and the second wavelength channel may specifically be as follows: the WDM network control apparatus outputs, to an interface of the WDM optical device, an electrical signal for instructing that the filtering bandwidth of at least one wavelength channel of the first wavelength channel and the second wavelength channel is to be adjusted. The WDM optical device adjusts the filtering bandwidth of the first wavelength channel and/or the second wavelength channel according to the electrical signal.

In an exemplary embodiment, specifically, the filtering bandwidth of at least one wavelength channel of the first wavelength channel and the second wavelength channel may be adjusted according to the result of comparing the modulation bandwidth of the first optical signal with the modulation bandwidth of the second optical signal and a result of comparing a transmission performance requirement of the first optical signal with a transmission performance requirement of the second optical signal. The transmission performance requirement of the first optical signal includes at least one of a transmission distance that the first optical signal needs to reach after being output through the first wavelength channel (that is, a requirement for a distance for which the first optical signal needs to be transmitted after being output through the first wavelength channel), the number of transmission spans that the first optical signal needs to reach after being output through the first wavelength channel (that is, a requirement for the number of spans across which the first optical signal needs to be transmitted after being output through the first wavelength channel), and a filtering damage requirement when the first optical signal passes through the first wavelength channel. The transmission performance requirement of the second optical signal includes at least one of a transmission distance that the second optical signal needs to reach after being output through the second wavelength channel (that is, a requirement for a distance for which the second optical signal needs to be transmitted after being output through the second wavelength channel), the number of transmission spans that the second optical signal needs to reach after being output through the second wavelength channel (that is, a requirement for the number of spans across which the second optical signal needs to be transmitted after being output through the second wavelength channel), and a filtering damage requirement when the second optical signal passes through the second wavelength channel. For example, the filtering bandwidth of at least one wavelength channel of the first wavelength channel and the second wavelength channel is adjusted according to the result of comparing the modulation bandwidth of the first optical signal with the modulation bandwidth of the second optical signal and a result of comparing the transmission distance that the first optical signal needs to reach after being output through the first wavelength channel with the transmission distance that the second optical signal needs to reach after being output through the second wavelength channel. Alternatively, the filtering bandwidth of at least one wavelength channel of the first wavelength channel and the second wavelength channel is adjusted according to the result of comparing the modulation bandwidth of the first optical signal with the modulation bandwidth of the second optical signal and a result of comparing the number of transmission spans that the first optical signal needs to reach after being output through the first wavelength channel with the number of transmission spans that the second optical signal needs to reach after being output through the second wavelength channel. Alternatively, the filtering bandwidth of at least one wavelength channel of the first wavelength channel and the second wavelength channel is adjusted according to the result of comparing the modulation bandwidth of the first optical signal with the modulation bandwidth of the second optical signal and a result of comparing the filtering damage requirement when the first optical signal passes through the first wavelength channel with the filtering damage requirement when the second optical signal passes through the second wavelength channel. For how to adjust the filtering bandwidth of at least one wavelength channel of the first wavelength channel and the second wavelength channel according to the result of comparing the modulation bandwidth of the first optical signal with the modulation bandwidth of the second optical signal and the result of comparing the transmission performance requirement of the first optical signal with the transmission performance requirement of the second optical signal, reference may be made to detailed description of subsequent embodiments.

In an exemplary embodiment, adjusted filtering bandwidth of the first wavelength channel and adjusted filtering bandwidth of the second wavelength channel can enable an overall performance index y of the first wavelength channel and the second wavelength channel to be a maximum or greater than a predetermined value. The overall performance index $$y = \sum_{i=1}^{N} B_i \times L_i,$$

where i is from 1 to 2 (that is, N=2). In a manner, $B_1$ and $B_2$ are bit rates of the first optical signal and the second optical signal respectively, $L_1$ is a transmission distance that the first optical signal can reach after being output through an adjusted first wavelength channel, and $L_2$ is a transmission distance that the second optical signal can reach after being output through an adjusted second wavelength channel. In another manner, $B_1$ and $B_2$ are bit rates of the first optical signal and the second optical signal respectively, $L_1$ is the number of transmission spans that the first optical signal can reach after being output through the adjusted first wavelength channel, and $L_2$ is the number of transmission spans that the second optical signal can reach after being output through the adjusted second wavelength channel. Instill another manner, $B_1$ and $B_2$ are baud rates of the first optical signal and the second optical signal respectively, $L_1$ is a transmission distance that the first optical signal can reach after being output through the adjusted first wavelength channel, and $L_2$ is a transmission distance that the second optical signal can reach after being output through the adjusted second wavelength channel. In still another manner, $B_1$ and $B_2$ are baud rates of the first optical signal and the second optical signal respectively, $L_1$ is the number of transmission spans that the first optical signal can reach after being output through the adjusted first wavelength channel, and $L_2$ is the number of transmission spans that the second optical signal can reach after being output through the adjusted second wavelength channel. Although among the adjusted filtering bandwidth of the first wavelength channel and the adjusted filtering bandwidth of the second wavelength channel, one filtering bandwidth becomes larger and the other filtering bandwidth becomes smaller, which may cause that one has better wavelength signal performance and the other has worse wavelength signal performance, the adjusted filtering bandwidth of the first wavelength channel and the adjusted filtering bandwidth of the second wavelength channel can enable the overall performance index y of the first wavelength channel and the second wavelength channel to be a maximum or greater than the predetermined value, which is equivalent to that when an optical network including the first wavelength channel and the second wavelength channel is viewed as a whole, the overall performance of the network is improved.

In the embodiment of the present invention, modulation bandwidth of optical signals received by adjacent wavelength channels of the optical device are compared, and filtering bandwidth of at least one wavelength channel of the adjacent wavelength channels is adjusted according to a comparison result, so that the filtering bandwidth of the wavelength channels of the optical device can be dynamically adjusted based on the modulation bandwidth of received optical signals.

In order to make the technical solutions provided by the foregoing embodiment of the present invention clearer, the foregoing embodiment of the present invention is described in detail through the following two embodiments. It should be noted that, in the following embodiments, although a WDM optical device is taken as an example for description, other optical devices with a plurality of wavelength channels are also applicable.

Figure 2:
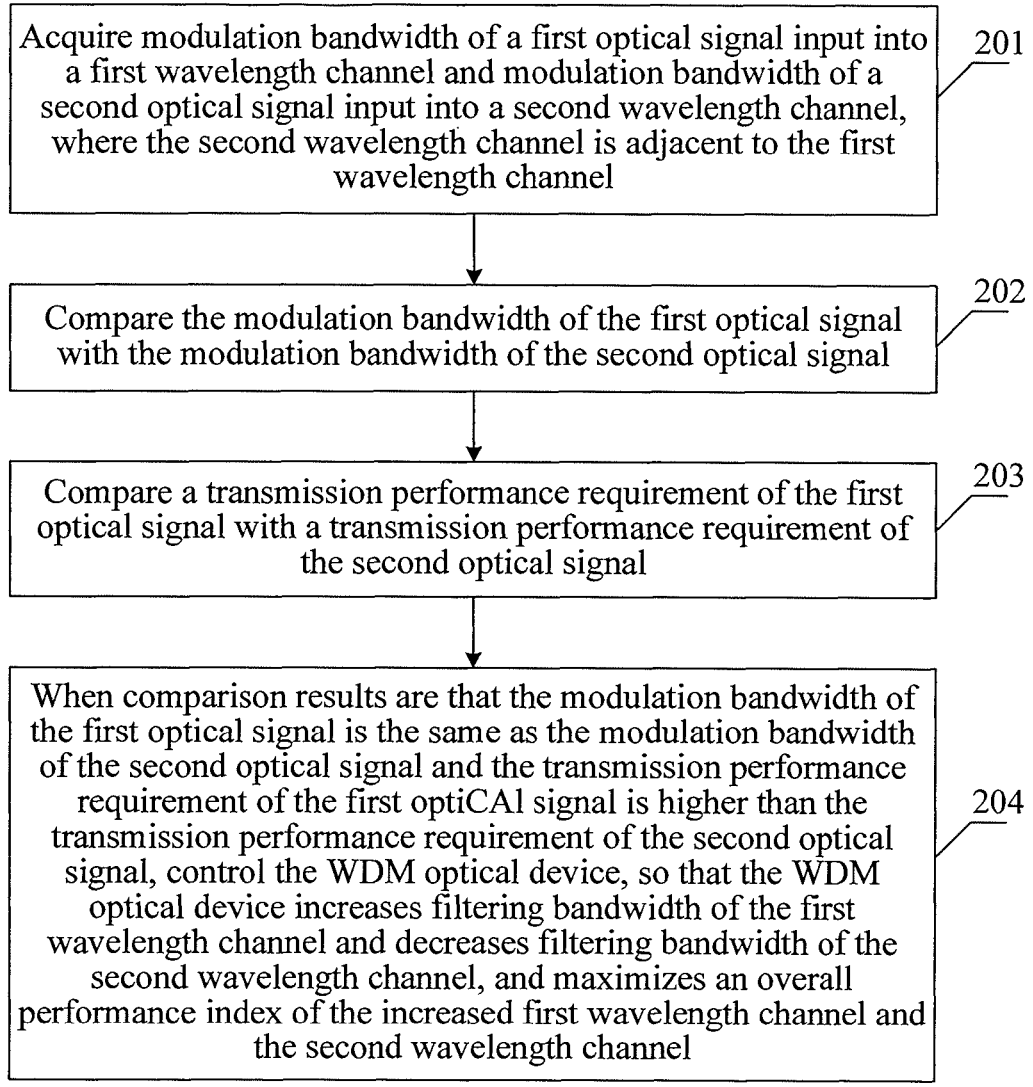
FIG. 2 is a flow chart of a method for adjusting filtering bandwidth of an optical device provided by another embodiment of the present invention.

FIG. 2 shows a method for adjusting filtering bandwidth of an optical device provided by an embodiment of the present invention. In the method, modulation bandwidth of a first optical signal input into a first wavelength channel of a WDM optical device is the same as modulation bandwidth of a second optical signal input into a second wavelength channel of the WDM optical device. The method specially includes:

201: A WDM network control apparatus acquires modulation bandwidth of a first optical signal input into a first wavelength channel and modulation bandwidth of a second optical signal input into a second wavelength channel. The second wavelength channel is adjacent to the first wavelength channel.

Specifically, the WDM network control apparatus acquires signal information of a WDM optical device from a WDM network management apparatus. The signal information includes information of the first optical signal and information of the second optical signal. The information of the first optical signal includes a baud rate, a bit rate, and a modulation format of the first optical signal, and the information of the second optical signal includes a baud rate, a bit rate, and a modulation format of the second optical signal. The modulation bandwidth of the first optical signal is calculated according to acquired information of the first optical signal; and the modulation bandwidth of the second optical signal is calculated according to acquired information of the second optical signal.

202: The WDM network control apparatus compares the modulation bandwidth of the first optical signal with the modulation bandwidth of the second optical signal.

203: The WDM network control apparatus compares a transmission performance requirement of the first optical signal with a transmission performance requirement of the second optical signal.

204: When comparison results are that the modulation bandwidth of the first optical signal is the same as the modulation bandwidth of the second optical signal and the transmission performance requirement of the first optical signal is higher than the transmission performance requirement of the second optical signal, control the WDM optical device, so that the WDM optical device increases filtering bandwidth of the first wavelength channel and decreases filtering bandwidth of the second wavelength channel, and maximizes an overall performance index y of the adjusted first wavelength channel and the adjusted second wavelength channel.

An implementation manner of controlling the optical device by the WDM network control apparatus, so that the optical device increases the filtering bandwidth of the first wavelength channel and decreases the filtering bandwidth of the second wavelength channel is: the WDM network control apparatus outputs, to an interface of the WDM optical device, an electrical signal for instructing that the filtering bandwidth is to be adjusted, where the electrical signal for instructing that the filtering bandwidth is to be adjusted instructs that the filtering bandwidth of the first wavelength channel is to be increased and the filtering bandwidth of the second wavelength channel is to be decreased. The WDM optical device adjusts the filtering bandwidth of the first wavelength channel and the second wavelength channel according to the electrical signal.

In step 203, the transmission performance requirement of the first optical signal includes a transmission distance that the first optical signal needs to reach after being output through the first wavelength channel, and the transmission performance requirement of the second optical signal includes a transmission distance that the second optical signal needs to reach after being output through the second wavelength channel; in step 204, that the transmission performance requirement of the first optical signal is higher than the transmission performance requirement of the second optical signal is that: the transmission distance that the first optical signal needs to reach after being output through the first wavelength channel is greater than the transmission distance that the second optical signal needs to reach after being output through the second wavelength channel. Alternatively, in step 203, the transmission performance requirement of the first optical signal includes the number of transmission spans that the first optical signal needs to reach after being output through the first wavelength channel, and the transmission performance requirement of the second optical signal includes the number of transmission spans that the second optical signal needs to reach after being output through the second wavelength channel; in step 204, that the transmission performance requirement of the first optical signal is higher than transmission performance requirement of the second optical signal is that: the number of transmission spans that the first optical signal needs to reach after being output through the first wavelength channel is greater than the number of transmission spans that the second optical signal needs to reach after being output through the second wavelength channel. In step 203, the transmission performance requirement of the first optical signal includes a filtering damage requirement when the first optical signal passes through the first wavelength channel, and the transmission performance requirement of the second optical signal includes a filtering damage requirement when the second optical signal passes through the second wavelength channel; in step 204, that the transmission performance requirement of the first optical signal is higher than transmission performance requirement of the second optical signal is that: the filtering damage when the first optical signal passes through the first wavelength channel is smaller than the filtering damage when the second optical signal passes through the second wavelength channel.

$$y = \sum_{i=1}^{N} B_i \times L_i,$$

where i is from 1 to 2. In the embodiment of the present invention, it is assumed that $B_1$ and $B_2$ are bit rates of the first optical signal and the second optical signal respectively, $L_1$ is the number of transmission spans or a transmission distance that the first optical signal can reach after being output through the adjusted first wavelength channel, and $L_2$ is the number of transmission spans or a transmission distance that the second optical signal can reach after being output through the adjusted second wavelength channel.

In order to make the technical solution provided by this embodiment more comprehensible, the following example is given for description: it is assumed that, in a WDM optical device with a channel interval of 50 GHz, an optical signal P is input into a first wavelength channel and an optical signal Q is input into a second wavelength channel, where both the optical signal P and the optical signal Q are optical signals with a bit rate of 100 Gb/s and with a modulation format of PDM-QPSK. Before adjustment, the filtering bandwidth of the first wavelength channel and the second wavelength channel enable the number of transmission spans of the optical signals P and Q to be 6. The transmission performance requirement of the first optical signal is that the optical signal P needs to be transmitted across 8 spans after passing through the first wavelength channel, and the transmission performance requirement of the second optical signal is that the optical signal Q needs to be transmitted across 3 spans after passing through the second wavelength channel. According to the technical solution in the prior art, the filtering bandwidth of the first wavelength channel and the second wavelength channel are not adjustable, so a repeater needs to be disposed in order to satisfy, as much as possible, the requirement that the optical signal P is transmitted across 8 spans after passing through the first wavelength channel, thereby increasing the cost and power consumption. However, according to the technical solution of the embodiment of the present invention, the filtering bandwidth of the first wavelength channel is slightly increased so that the requirement that the optical signal P is transmitted across 8 spans after passing through the first wavelength channel is met as much as possible; accordingly, the filtering bandwidth of the second wavelength channel is decreased so that the requirement that the optical signal Q is transmitted across 3 spans after passing through the second wavelength channel is met as much as possible. If the requirement that the optical signal P is transmitted across 8 spans after passing through the first wavelength channel and the requirement that the optical signal Q is transmitted across 3 spans after passing through the second wavelength channel are not satisfied, a decrease extent of the filtering bandwidth of the second wavelength channel and an increase extent of the filtering bandwidth of the first wavelength channel need to be calculated based on the overall performance index y of the first wavelength channel and the second wavelength channel, that is, a product of the number of transmission spans of the optical signal Q, which is output through the second wavelength channel and is after the filtering bandwidth is decreased, and the bit rate of the optical signal Q is pre-calculated, a product of the number of transmission spans of the optical signal P, which is output through the first wavelength channel and is after the filtering bandwidth is increased, and the bit rate of the optical signal P is pre-calculated, and a sum of the two products is maximized, where the number of transmission spans of the optical signal Q, which is output through the second wavelength channel and is after the filtering bandwidth is decreased, is a function of the adjusted filtering bandwidth of the second wavelength channel, and the number of transmission spans of the optical signal P, which is output through the first wavelength channel and is after the filtering bandwidth is increased, is a function of the adjusted filtering bandwidth of the first wavelength channel; alternatively, a product of a transmission distance of the optical signal Q, which is output through the second wavelength channel and is after filtering bandwidth is decreased, and the bit rate of the optical signal Q is pre-calculated, a product of a transmission distance of the optical signal P, which is output through the first wavelength channel and is after filtering bandwidth is increased, and the bit rate of the optical signal P is pre-calculated, and a sum of the two products is maximized, where the transmission distance of the optical signal Q, which is output through the second wavelength channel and is after the filtering bandwidth decreased, is a function of the adjusted filtering bandwidth of the second wavelength channel, and the transmission distance of the optical signal P, which is output through the first wavelength channel and is after the filtering bandwidth is increased, is a function of the adjusted filtering bandwidth of the first wavelength channel.

In the embodiment of the present invention, the modulation bandwidth of the first optical signal input into the first wavelength channel of the WDM optical device is compared with the modulation bandwidth of the second optical signal input into the second wavelength channel, and the transmission performance requirements of the first optical signal and the second optical signal are compared. When the modulation bandwidth of the optical signals input into adjacent wavelength channels (that is, the first wavelength channel and the second wavelength channel) are the same, and the transmission performance requirement of the first optical signal is higher than the transmission performance requirement of the second optical signal, the WDM optical device is controlled so that the WDM optical device increases the filtering bandwidth of the first wavelength channel and decreases the filtering bandwidth of the second wavelength channel, therefore, the filtering bandwidth of the wavelength channels of the optical device can be dynamically adjusted based on the modulation bandwidths of the received optical signals. Furthermore, the overall performance index y of the adjusted first wavelength channel and second wavelength channel is maximized, so an overall performance of an optical network including the first wavelength channel and the second wavelength channel may be improved.

Figure 3:
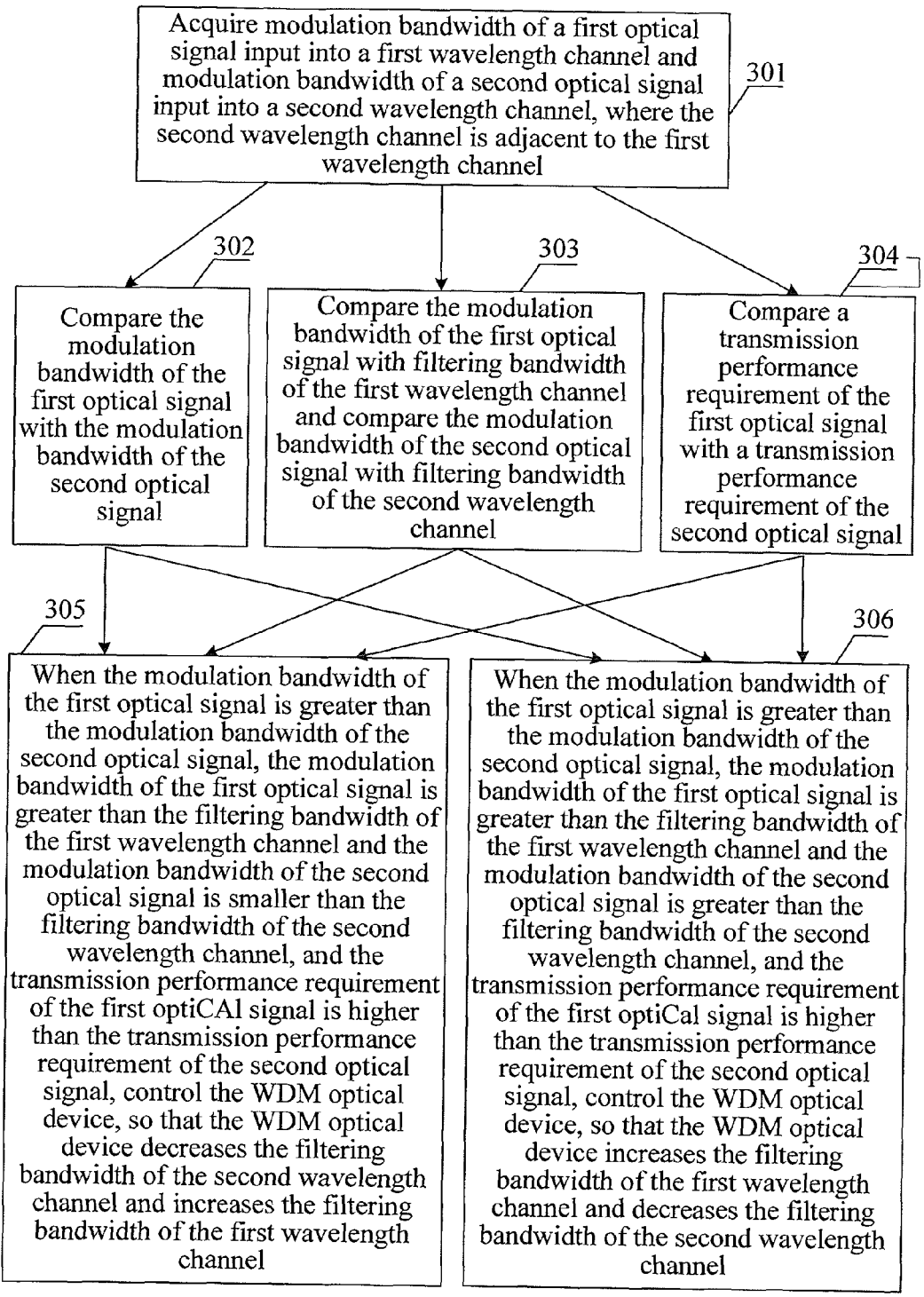
FIG. 3 is a flow chart of a method for adjusting filtering bandwidth of an optical device provided by still another embodiment of the present invention.

FIG. 3 shows another method for adjusting filtering bandwidth of an optical device provided by an embodiment of the present invention. In the method, a modulation bandwidth of a first optical signal input into a first wavelength channel of a WDM optical device is greater than modulation bandwidth of a second optical signal input into a second wavelength channel. The method specially includes:

301: A WDM network control apparatus acquires modulation bandwidth of a first optical signal input into a first wavelength channel and modulation bandwidth of a second optical signal input into a second wavelength channel. The second wavelength channel is adjacent to the first wavelength channel.

Specifically, the WDM network control apparatus acquires signal information of a WDM optical device from a WDM network management apparatus. The signal information includes information of the first optical signal and information of the second optical signal. The information of the first optical signal includes a baud rate, a bit rate, and a modulation format of the first optical signal, and the information of the second optical signal includes a baud rate, a bit rate, and a modulation format of the second optical signal. The modulation bandwidth of the first optical signal is calculated according to the acquired information of the first optical signal; the modulation bandwidth of the second optical signal is calculated according to the acquired information of the second optical signal.

302: The WDM network control apparatus compares the modulation bandwidth of the first optical signal with the modulation bandwidth of the second optical signal.

303: The WDM network control apparatus compares the modulation bandwidth of the first optical signal with filtering bandwidth of the first wavelength channel and compares the modulation bandwidth of the second optical signal with filtering bandwidth of the second wavelength channel.

304: The WDM network control apparatus compares a transmission performance requirement of the first optical signal with a transmission performance requirement of the second optical signal.

305: When a comparison result in step 302 is that the modulation bandwidth of the first optical signal is greater than the modulation bandwidth of the second optical signal, a comparison result in step 303 is that the modulation bandwidth of the first optical signal is greater than the filtering bandwidth of the first wavelength channel and the modulation bandwidth of the second optical signal is smaller than the filtering bandwidth of the second wavelength channel, and a comparison result in step 304 is that the transmission performance requirement of the first optical signal is higher than the transmission performance requirement of the second optical signal, the WDM network control apparatus controls the WDM optical device, so that the WDM optical device decreases the filtering bandwidth of the second wavelength channel, therefore, the deceased waveband bandwidth of the second wavelength channel can satisfy the transmission performance requirement of the second optical signal, and controls the WDM optical device, so that the WDM optical device increases the filtering bandwidth of the first wavelength channel, where an increase extent of the filtering bandwidth of the first wavelength channel is smaller than or equal to a decrease extent of the filtering bandwidth of the second wavelength channel.

306: When the comparison result in step 302 is that the modulation bandwidth of the first optical signal is greater than the modulation bandwidth of the second optical signal, the comparison result in step 303 is that the modulation bandwidth of the first optical signal is greater than the filtering bandwidth of the first wavelength channel and the modulation bandwidth of the second optical signal is greater than the filtering bandwidth of the second wavelength channel, and the comparison result in step 304 is that the transmission performance requirement of the first optical signal is higher than the transmission performance requirement of the second optical signal, the WDM network control apparatus controls the WDM optical device, so that the WDM optical device increases the filtering bandwidth of the first wavelength channel, decreases the filtering bandwidth of the second wavelength channel, and maximizes an overall performance index y of the first wavelength channel and the second wavelength channel.

The transmission performance requirement of the first optical signal and the transmission performance requirement of the second optical signal in this embodiment are similar to the transmission performance requirement of the first optical signal and the transmission performance requirement of the second optical signal in the previous embodiment and are not described here again.

$$y = \sum_{i=1}^{N} B_i \times L_i,$$

where i is from 1 to 2. In the embodiment of the present invention, it is assumed that $B_1$ and $B_2$ are bit rates of the first optical signal and the second optical signal respectively, $L_1$ is a transmission distance or the number of transmission spans that the first optical signal can reach after being output through the adjusted first wavelength channel, and $L_2$ is a transmission distance or the number of transmission spans that the second optical signal can reach after being output through the adjusted second wavelength channel.

In order to make the technical solution provided by this embodiment more comprehensible, the following examples are given for description:

It is assumed that, in a WDM optical device with a channel interval of 50 GHz, an optical signal P is input into a first wavelength channel and an optical signal Q is input into a second wavelength channel. The optical signal P is an optical signal with a bit rate of 100 Gb/s and with a modulation format of PDM-QPSK. In this case, 3 dB modulation bandwidth of the optical signal P is 36 GHz. The optical signal Q is an optical signal with a bit rate of 10 Gb/s and with a modulation format of OOK. In this case, 3 dB modulation bandwidth of the optical signal Q is 14 GHz. The filtering bandwidth of the first wavelength channel and the second wavelength channel are both 20 GHz. If the transmission performance requirement of the first optical signal is higher than the transmission performance requirement of the second optical signal, for example, the optical signal P needs to be transmitted across 10 spans after being output through the first wavelength channel and the optical signal Q needs to be transmitted across 6 spans after being output through the second wavelength channel, the filtering bandwidth of the first wavelength channel may be increased from 20 GHz to 30 GHz and the filtering bandwidth of the second wavelength channel may be decreased from 20 G to 15 GHz. The filtering bandwidth of the second wavelength channel after a decrease is still greater than the modulation bandwidth being 14 GHz of the optical signal Q, so in this bandwidth adjustment manner, no filtering damage exists when the optical signal Q passes through the second wavelength channel, but filtering damage when the optical signal P passes through the first wavelength channel can be effectively decreased.

It is assumed that, in a WDM optical device with a channel interval of 50 GHz, an optical signal P is input into a first wavelength channel and an optical signal Q is input into a second wavelength channel. The optical signal P is an optical signal with a bit rate of 100 Gb/s and with a modulation format of PDM-QPSK. In this case, 3 dB modulation bandwidth of the optical signal P is about 36 GHz. The optical signal Q is an optical signal with a bit rate of 40 Gb/s and with a modulation format of QPSK. In this case, 3 dB modulation bandwidth of the optical signal Q is about 30 GHz. The filtering bandwidth of the first wavelength channel and the second wavelength channel are both 20 GHz. If the transmission performance requirement of the first optical signal is higher than the transmission performance requirement of the second optical signal, for example, filtering damage incurred by the first wavelength channel to the first optical signal needs to be smaller than a filtering damage incurred by the second wavelength channel to the second optical signal, the filtering bandwidth of the first wavelength channel may be increased from 20 GHz to 22 GHz and the filtering bandwidth of the second wavelength channel may be decreased from 20 G to 18 GHz. Although the filtering bandwidth of the second wavelength channel after the decrease is smaller than the modulation bandwidth being 30 GHz of the optical signal Q, an overall performance index y of the first wavelength channel and the second wavelength channel is maximized, thereby improving an overall performance of an optical network including the first wavelength channel and the second wavelength channel.

In the embodiment of the present invention, the modulation bandwidth of the first optical signal input into the first wavelength channel of the WDM optical device is compared with the modulation bandwidth of the second optical signal input into the second wavelength channel, and the transmission performance requirements of the first optical signal and the second optical signal are compared. When the modulation bandwidth of the first optical signal is greater than the modulation bandwidth of the second optical signal and the transmission performance requirement of the first optical signal is higher than then transmission performance requirement of the second optical signal, the WDM optical device is controlled, so that the WDM optical device increases the filtering bandwidth of the first wavelength channel and decreases the filtering bandwidth of the second wavelength channel, therefore, the filtering bandwidth of the wavelength channels of the optical device can be dynamically adjusted based on the modulation bandwidth of the received optical signals. Furthermore, the overall performance index y of the adjusted first wavelength channel and second wavelength channel is maximized, so the overall performance of the optical network including the first wavelength channel and the second wavelength channel is improved.

Figure 4:
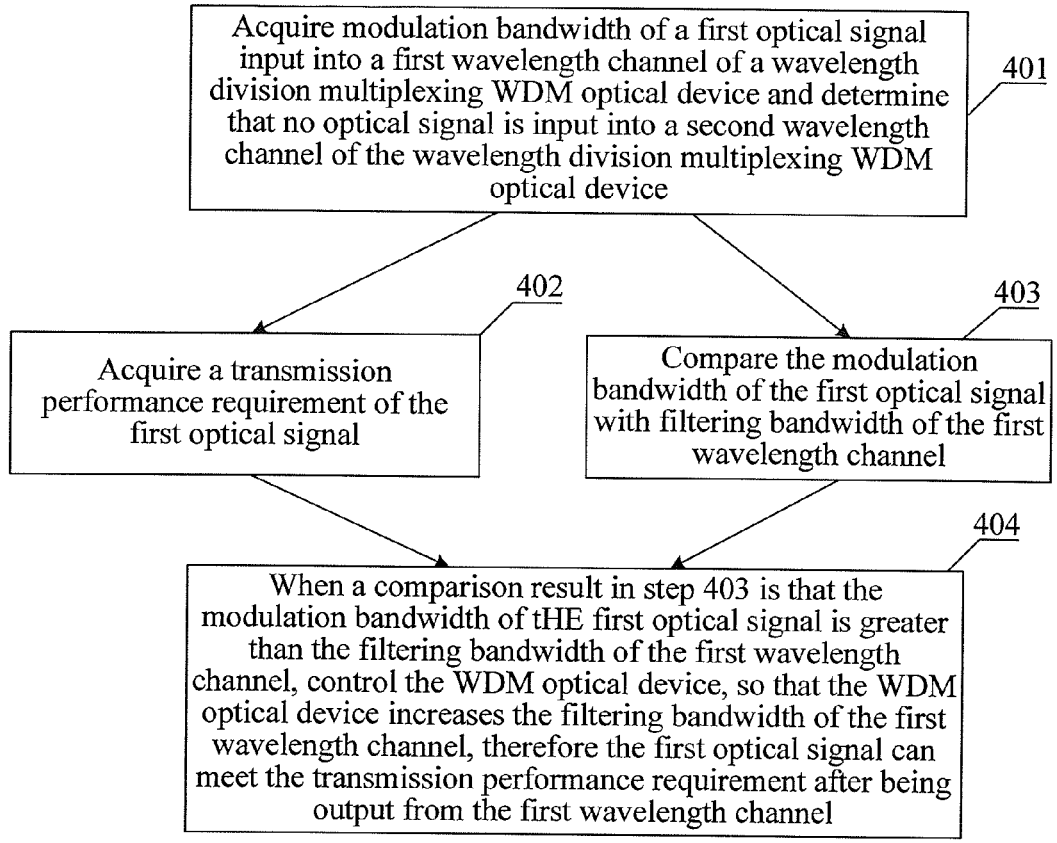
FIG. 4 is a flow chart of a method for adjusting filtering bandwidth of an optical device provided by still another embodiment of the present invention.

FIG. 4 shows another method for adjusting filtering bandwidth of an optical device provided by an embodiment of the present invention. In the method, an optical signal is transmitted in a first wavelength channel of a WDM optical device and no optical signal is transmitted in a second wavelength channel of the WDM optical device. The method specially includes:

401: A WDM network control apparatus acquires modulation bandwidth of a first optical signal input into a first wavelength channel of a WDM optical device and determines that no optical signal is input into a second wavelength channel of the WDM optical device. The first wavelength channel is adjacent to the second wavelength channel.

Specifically, the WDM network control apparatus acquires signal information of the WDM optical device from a WDM network management apparatus, where the signal information includes information of the first optical signal. The WDM network control apparatus calculates the modulation bandwidth of the first optical signal according to the acquired information of the first optical signal. The signal information of the WDM optical device acquired by the WDM network control apparatus does not include information of an optical signal input into the second wavelength channel of the WDM optical device, so it may be determined that no optical signal is input into the second wavelength channel of the WDM optical device.

The information of the first optical signal includes a baud rate, a bit rate, and a modulation format of the first optical signal. The WDM network control apparatus calculates the modulation bandwidth of the first optical signal according to the acquired information of the first optical signal.

402: The WDM network control apparatus acquires a transmission performance requirement of the first optical signal.

In the embodiment of the present invention, the transmission performance requirement of the first optical signal includes a requirement for the number of spans across which the first optical signal needs to be transmitted after being output through the first wavelength channel. For example, the first optical signal needs to be transmitted across 8 spans after being output through the first wavelength channel.

403: The WDM network control apparatus compares the modulation bandwidth of the first optical signal with filtering bandwidth of the first wavelength channel.

404: When a comparison result in step 403 is that the modulation bandwidth of the first optical signal is greater than the filtering bandwidth of the first wavelength channel, the WDM network control apparatus controls the WDM optical device, so that the WDM optical device increases the filtering bandwidth of the first wavelength channel, therefore the first optical signal can meet the transmission performance requirement after being output through the first wavelength channel.

It should be noted that, the increased filtering bandwidth of the first wavelength channel cannot cross a third wavelength channel adjacent to the second wavelength channel.

In order to make the technical solution provided by this embodiment more comprehensible, the following example is given for description:

It is assumed that, in a WDM optical device with a channel interval of 50 GHz, an optical signal P is input into a first wavelength channel, where the optical signal P is an optical signal with a bit rate of 40 Gb/s and with a modulation format of QPSK; no optical signal is input into a second wavelength channel, and an obtained transmission performance requirement of the optical signal P is as follows: the optical signal P needs to be transmitted across 12 spans after being output through the first wavelength channel. If current filtering bandwidth of the first wavelength channel of the WDM optical device is 20 GHz (in the example, the filtering bandwidth is 3 dB filtering bandwidth), the optical signal P can only be transmitted across 9 spans after being output through the first wavelength channel, which cannot satisfy the transmission performance requirement of the optical signal P. By using the technical solution of the present invention, because the second wavelength channel is not used, the filtering bandwidth of the first wavelength channel may be increased without considering the influence on the second wavelength channel, so that the optical signal P can be transmitted across 12 spans after being output through the first wavelength channel. For example, the filtering bandwidth of the first wavelength channel is adjusted from 20 GHz to 28 GHz, so that the optical signal P can be transmitted across 12 spans after being output through the adjusted first wavelength channel, thereby optimizing overall transmission performance of the WDM optical device.

In the embodiment of the present invention, in the case that an optical signal is input into one of adjacent wavelength channels of the WDM optical device and no optical signal is input into the other wavelength channel, the filtering bandwidth of the wavelength channel with the input optical signal can be adjusted, and the transmission performance requirement of the optical signal can be satisfied by using the adjusted filtering bandwidth to transmit the optical signal.

In step 404 of the embodiment, whether an adjustment result of the filtering bandwidth of the first wavelength channel satisfies the transmission performance requirement of the first optical signal may be specifically implemented in an analog simulation manner. For example, the current filtering bandwidth of the first wavelength channel is used as initial bandwidth, and the filtering bandwidth of the first wavelength channel is increased by $\Delta\alpha$. In this case, it is judged whether the filtering bandwidth of the first wavelength channel satisfies the transmission performance requirement of the first optical signal; if not, the filtering bandwidth of the first wavelength channel is further increased by $\Delta\alpha$. In this way, gradual adjustment is performed until the transmission performance requirement of the first optical signal is satisfied.

Similarly, a similar manner is used to ensure that decreased waveband bandwidth of the second wavelength channel in step 305 can satisfy the transmission performance requirement of the second optical signal. Specifically, current filtering bandwidth of the second wavelength channel is used as initial bandwidth, and then the filtering bandwidth of the second wavelength channel is deceased by $\Delta\alpha$. In this case, it is judged whether the filtering bandwidth of the second wavelength channel can satisfy the transmission performance requirement of the second optical signal; if yes, the filtering bandwidth of the second wavelength channel is further deceased by $\Delta\alpha$ until the transmission performance requirement of the second optical signal cannot be satisfied. Then, the last adjusted filtering bandwidth of the second wavelength channel is increased by $\Delta\alpha$. In this case, the bandwidth is most suitable bandwidth of the second wavelength channel, which can not only meet the performance requirement of the second optical signal but also provide a largest adjustment space for bandwidth adjustment of the first wavelength channel.

Similarly, a similar manner is used to ensure a maximum of the overall performance index y of the first wavelength channel and the second wavelength channel in step 204 and step 306. That is: current filtering bandwidth of the first wavelength channel is used as initial bandwidth of the first wavelength channel and current filtering bandwidth of the second wavelength channel is used as initial bandwidth of the second wavelength channel. The filtering bandwidth of the first wavelength channel is increased by $\Delta\alpha$, and a transmission distance or the number of transmission spans caused by the increased filtering bandwidth of the first wavelength channel is pre-calculated. The filtering bandwidth of the second wavelength channel is decreased by $\Delta\beta$, and a transmission distance or the number of transmission spans caused by the decreased filtering bandwidth of the second wavelength channel is pre-calculated. The two transmission distances or the two numbers of transmission spans are added. Then, the filtering bandwidth of the first wavelength channel is further increased by $\Delta\alpha$, and a transmission distance or the number of transmission spans caused by the increased filtering bandwidth of the first wavelength channel is pre-calculated. The filtering bandwidth of the second wavelength channel is further decreased by $\Delta\beta$, and a transmission distance or the number of transmission spans caused by the decreased filtering bandwidth of the second wavelength channel is pre-calculated. The two transmission distances or the two numbers of transmission spans are added. The multiple sums are compared to find a maximum. Filtering bandwidth of the first wavelength channel and filtering bandwidth of the second wavelength channel that correspond to the maximum are the adjusted bandwidth in step 204 and step 306.

Other manners may also be adopted to ensure that the adjustment result of the filtering bandwidth of the first wavelength channel can satisfy the transmission performance requirement of the first optical signal. For example, based on the transmission performance requirement of the first optical signal and the modulation bandwidth of the first optical signal, the filtering bandwidth of the first wavelength channel satisfying the transmission performance requirement of the first optical signal is calculated. Other manners may also be adopted to ensure that the decreased waveband bandwidth of the second wavelength channel in step 305 can satisfy the transmission performance requirement of the second optical signal. For example, based on the transmission performance requirement of the second optical signal and the modulation bandwidth of the second optical signal, the filtering bandwidth of the second wavelength channel satisfying the transmission performance requirement of the second optical signal is calculated.

It should be noted that, in the foregoing embodiments, the information of the first optical signal acquired by the WDM network control apparatus may also include residual dispersion of the first optical signal, and the information of the second optical signal may also include residual dispersion of the second optical signal. Specifically, residual dispersion of the optical signal input into a wavelength channel may be compensated for to a certain degree by increasing or decreasing dispersion of a corresponding wavelength channel. For example, if residual dispersion of an optical signal input into a wavelength channel is 30 ps/nm, dispersion of the wavelength channel of the WDM optical device may be decreased from 5 ps/nm (assuming that the dispersion is 5 ps/nm before adjustment) to −30 ps/nm, so as to completely compensate for the residual dispersion of the optical signal input into the wavelength channel. For another example, if residual dispersion of an optical signal input into a wavelength channel is −50 ps/nm and a dispersion adjustment range of a corresponding channel of the WDM optical device is [−35, +35] ps/nm, the dispersion of the channel may be increased from 5 ps/nm (assuming that the dispersion is 5 ps/nm before adjustment) to +35 ps/nm, so as to compensate for the residual dispersion of the optical signal input into the wavelength channel to a certain degree.

The technical solution provided by the embodiment is applicable to not only a WDM optical device with two wavelength channels but also a WDM optical device with multiple wavelength channels.

Figure 5:
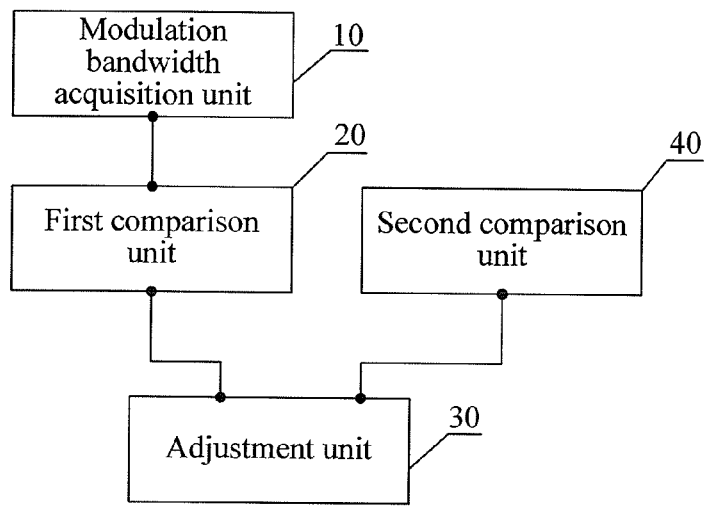
FIG. 5 is a structural diagram of a device for adjusting filtering bandwidth of an optical device provided by an embodiment of the present invention.

Referring to FIG. 5, an embodiment of the present invention provides a device for adjusting filtering bandwidth of an optical device. The device for adjusting filtering bandwidth of an optical device may be a WDM network control apparatus and includes:

a modulation bandwidth acquisition unit 10, configured to acquire modulation bandwidth of a first optical signal and modulation bandwidth of a second optical signal, where the first optical signal is an optical signal input into a first wavelength channel of an optical device, the second optical signal is an optical signal input into a second wavelength channel of the optical device, the second wavelength channel is adjacent to the first wavelength channel, and channel intervals of the optical device may be the same, for example, the channel intervals are 50 GHz or 100 GHz;

a first comparison unit 20, configured to compare the modulation bandwidth of the first optical signal with the modulation bandwidth of the second optical signal; and an adjustment unit 30, configured to: according to a result of comparing the modulation bandwidth of the first optical signal with the modulation bandwidth of the second optical signal, adjust filtering bandwidth of at least one wavelength channel of the first wavelength channel and the second wavelength channel.

In order to take into account a transmission performance requirement of the first optical signal and a transmission performance requirement of the second optical signal during adjustment, the device further includes: a second comparison unit 40, configured to compare the transmission performance requirement of the first optical signal and the transmission performance requirement of the second optical signal. The adjustment unit 30 is configured to: according to a comparison result of the first comparison unit and a comparison result of the second comparison unit, adjust the filtering bandwidth of at least one wavelength channel of the first wavelength channel and the second wavelength channel. The transmission performance requirement of the first optical signal and the transmission performance requirement of the second optical signal in this embodiment are similar to the transmission performance requirement of the first optical signal and the transmission performance requirement of the second optical signal in the method embodiments and are not described here again.

In an implementation manner, the adjustment unit 30 is specifically configured to: when the comparison result of the first comparison unit is that the modulation bandwidth of the first optical signal is the same as the modulation bandwidth of the second optical signal and the comparison result of the second comparison unit is that the transmission performance requirement of the first optical signal is higher than the transmission performance requirement of the second optical signal, control the optical device, so that the optical device increases the filtering bandwidth of the first wavelength channel and decreases the filtering bandwidth of the second wavelength channel.

In another implementation manner, the adjustment unit 30 is specifically configured to: when the comparison result of the first comparison unit is that the modulation bandwidth of the first optical signal is greater than the modulation bandwidth of the second optical signal and the comparison result of the second comparison unit is that the transmission performance requirement of the first optical signal is higher than the transmission performance requirement of the second optical signal, control the optical device, so that the optical device increases the filtering bandwidth of the first wavelength channel and decreases the filtering bandwidth of the second wavelength channel. The channel intervals of the optical device are the same; the modulation bandwidth of the first optical signal is greater than the filtering bandwidth of the first wavelength channel, and the modulation bandwidth of the second optical signal is smaller than the filtering bandwidth of the second wavelength channel. Alternatively, the channel intervals of the optical device are the same; the modulation bandwidth of the first optical signal is greater than the modulation bandwidth of the second optical signal, and the modulation bandwidth of the second optical signal is greater than the filtering bandwidth of the second wavelength channel.

The adjusted filtering bandwidth of the first wavelength channel and filtering bandwidth of the second wavelength channel can enable an overall performance index y of the first wavelength channel and the second wavelength channel to be a maximum or greater than a predetermined value. The overall performance index $$y = \sum_{i=1}^{N} B_i \times L_i,$$

where i is from 1 to 2, $B_1$ and $B_2$ are bit rates or baud rates of the first optical signal and the second optical signal respectively, $L_1$ is a transmission distance that the first optical signal can reach after being output through the adjusted first wavelength channel, and $L_2$ is a transmission distance that the second optical signal can reach after being output through the adjusted second wavelength channel; alternatively, $L_1$ is the number of transmission spans that the first optical signal can reach after being output through the adjusted first wavelength channel, and $L_2$ is the number of transmission spans that the second optical signal can reach after being output through the adjusted second wavelength channel.

In the embodiment of the present invention, modulation bandwidth of optical signals input into adjacent wavelength channels of the optical device are compared, and filtering bandwidth of at least one wavelength channel of the adjacent wavelength channels is adjusted according to a comparison result, so that the filtering bandwidth of the wavelength channels of the optical device can be dynamically adjusted based on the modulation bandwidth of the received optical signals. Furthermore, the overall performance index y of the adjusted first wavelength channel and second wavelength channel is maximized, thereby improving overall performance of an optical network including the first wavelength channel and the second wavelength channel.

Persons skilled in the art may understand that all or part of steps in the method of the above embodiments may be implemented by programs instructing relevant hardware, and the programs may be stored in a computer readable storage medium, such as a read-only memory, a magnetic disc, or an optical disc.

The method and device for adjusting the filtering bandwidth of the optical device provided by the embodiments of the present invention are described in detail above. The principle and implementation of the present invention are described here through specific examples. The description about the embodiments is merely provided for better understanding the method and core ideas of the present invention. Persons skilled in the art may make variations and modifications to the specific implementations and application scopes according to the ideas of the present invention. Therefore, the specification shall not be construed as a limit to the present invention.

What is claimed is:

1. A method for adjusting filtering bandwidth of an optical device, the method comprising:
   acquiring a modulation bandwidth of a first optical signal and a modulation bandwidth of a second optical signal, wherein the first optical signal is an optical signal input into a first wavelength channel of an optical device, the second optical signal is an optical signal input into a second wavelength channel of the optical device, and the second wavelength channel is adjacent to the first wavelength channel;
   comparing the modulation bandwidth of the first optical signal with the modulation bandwidth of the second optical signal; and
   according to a result of comparing the modulation bandwidth of the first optical signal with the modulation bandwidth of the second optical signal, adjusting a filtering bandwidth of at least one wavelength channel of the first wavelength channel and the second wavelength channel.

2. The method according to claim 1, wherein
   the adjusting the filtering bandwidth of at least one wavelength channel of the first wavelength channel and the second wavelength channel according to the result of comparing the modulation bandwidth of the first optical signal with the modulation bandwidth of the second optical signal comprises:
   adjusting the filtering bandwidth of at least one wavelength channel of the first wavelength channel and the second wavelength channel according to the result of comparing the modulation bandwidth of the first optical signal with the modulation bandwidth of the second optical signal and a result of comparing a transmission performance requirement of the first optical signal with a transmission performance requirement of the second optical signal, wherein
   the transmission performance requirement of the first optical signal comprises at least one of a requirement for a distance for which the first optical signal needs to be transmitted after being output through the first wavelength channel, a requirement for the number of spans across which the first optical signal needs to be transmitted after being output through the first wavelength channel, and a filtering damage requirement when the first optical signal passes through the first wavelength channel; and
   the transmission performance requirement of the second optical signal comprises at least one of a requirement for a distance for which the second optical signal needs to be transmitted after being output through the second wavelength channel, a requirement for the number of spans across which the second optical signal needs to be transmitted after being output through the second wavelength channel, and a filtering damage requirement when the second optical signal passes through the second wavelength channel.

3. The method according to claim 2, wherein
   the adjusting the filtering bandwidth of at least one wavelength channel of the first wavelength channel and the second wavelength channel according to the result of comparing the modulation bandwidth of the first optical signal with the modulation bandwidth of the second optical signal and the result of comparing the transmission performance requirement of the first optical signal with the transmission performance requirement of the second optical signal comprises:
   when the modulation bandwidth of the first optical signal is the same as the modulation bandwidth of the second optical signal and the transmission performance requirement of the first optical signal is higher than the transmission performance requirement of the second optical signal, controlling the optical device so that the optical device increases the filtering bandwidth of the first wavelength channel and decreases the filtering bandwidth of the second wavelength channel.

4. The method according to claim 2, wherein
   the adjusting the filtering bandwidth of at least one wavelength channel of the first wavelength channel and the second wavelength channel according to the result of comparing the modulation bandwidth of the first optical signal with the modulation bandwidth of the second optical signal and the result of comparing the transmission performance requirement of the first optical signal with the transmission performance requirement of the second optical signal comprises:
   when the modulation bandwidth of the first optical signal is greater than the modulation bandwidth of the second optical signal and the transmission performance requirement of the first optical signal is higher than the transmission performance requirement of the second optical signal, controlling the optical device so that the optical device increases the filtering bandwidth of the first wavelength channel and decreases the filtering bandwidth of the second wavelength channel.

5. The method according to claim 4, wherein
   channel intervals of the optical device are the same; the modulation bandwidth of the first optical signal is greater than the filtering bandwidth of the first wavelength channel, and the modulation bandwidth of the second optical signal is smaller than the filtering bandwidth of the second wavelength channel, or,
channel intervals of the optical device are the same; the modulation bandwidth of the first optical signal is greater than the modulation bandwidth of the second optical signal, and the modulation bandwidth of the second optical signal is greater than the filtering bandwidth of the second wavelength channel.

6. The method according to claim 3, wherein
the adjusted filtering bandwidth of the first wavelength channel and the adjusted filtering bandwidth of the second wavelength channel are capable of enabling an overall performance index y of the first wavelength channel and the second wavelength channel to be a maximum or greater than a predetermined value, and the overall performance index $$y = \sum_{i=1}^{N} B_i \times L_i,$$

wherein i is from 1 to 2, $B_1$ and $B_2$ are bit rates or baud rates of the first optical signal and the second optical signal respectively, $L_1$ is a transmission distance that the first optical signal is able to reach after being output through an adjusted first wavelength channel, and $L_2$ is a transmission distance that the second optical signal is able to reach after being output through an adjusted second wavelength channel; or, $L_1$ is the number of transmission spans that the first optical signal is able to reach after being output through the adjusted first wavelength channel, and $L_2$ is the number of transmission spans that the second optical signal is able to reach after being output through the adjusted second wavelength channel.

7. The method according to claims 4, wherein
the adjusted filtering bandwidth of the first wavelength channel and the adjusted filtering bandwidth of the second wavelength channel are capable of enabling an overall performance index y of the first wavelength channel and the second wavelength channel to be a maximum or greater than a predetermined value, and the overall performance index $$y = \sum_{i=1}^{N} B_i \times L_i,$$

wherein i is from 1 to 2, $B_1$ and $B_2$ are bit rates or baud rates of the first optical signal and the second optical signal respectively, $L_1$ is a transmission distance that the first optical signal is able to reach after being output through an adjusted first wavelength channel, and $L_2$ is a transmission distance that the second optical signal is able to reach after being output through an adjusted second wavelength channel; or, $L_1$ is the number of transmission spans that the first optical signal is able to reach after being output through the adjusted first wavelength channel, and $L_2$ is the number of transmission spans that the second optical signal is able to reach after being output through the adjusted second wavelength channel.

8. The method according to claim 5, wherein
the adjusted filtering bandwidth of the first wavelength channel and the adjusted filtering bandwidth of the second wavelength channel are capable of enabling an overall performance index y of the first wavelength channel and the second wavelength channel to be a maximum or greater than a predetermined value, and the overall performance index $$y = \sum_{i=1}^{N} B_i \times L_i,$$

wherein i is from 1 to 2, $B_1$ and $B_2$ are bit rates or baud rates of the first optical signal and the second optical signal respectively, $L_1$ is a transmission distance that the first optical signal is able to reach after being output through an adjusted first wavelength channel, and $L_2$ is a transmission distance that the second optical signal is able to reach after being output through an adjusted second wavelength channel; or, $L_1$ is the number of transmission spans that the first optical signal is able to reach after being output through the adjusted first wavelength channel, and $L_2$ is the number of transmission spans that the second optical signal is able to reach after being output through the adjusted second wavelength channel.

9. A device for adjusting filtering bandwidth of an optical device, the device comprising:
a modulation bandwidth acquisition unit, configured to acquire a modulation bandwidth of a first optical signal and a modulation bandwidth of a second optical signal, wherein the first optical signal is an optical signal input into a first wavelength channel of an optical device, the second optical signal is an optical signal input into a second wavelength channel of the optical device, and the second wavelength channel is adjacent to the first wavelength channel;
a first comparison unit, configured to compare the modulation bandwidth of the first optical signal with the modulation bandwidth of the second optical signal; and
an adjustment unit, configured to: according to a result of comparing the modulation bandwidth of the first optical signal with the modulation bandwidth of the second optical signal, adjust filtering bandwidth of at least one wavelength channel of the first wavelength channel and the second wavelength channel.

10. The device according to claim 9, further comprising:
a second comparison unit, configured to compare a transmission performance requirement of the first optical signal with a transmission performance requirement of the second optical signal, wherein
the adjustment unit is configured to: according to a comparison result of the first comparison unit and a comparison result of the second comparison unit, adjust the filtering bandwidth of at least one wavelength channel of the first wavelength channel and the second wavelength channel.

11. The device according to claim 10, wherein,
the adjustment unit is configured to: when the comparison result of the first comparison unit is that the modulation bandwidth of the first optical signal is the same as the modulation bandwidth of the second optical signal and the comparison result of the second comparison unit is that the transmission performance requirement of the first optical signal is higher than the transmission performance requirement of the second optical signal, control the optical device so that the optical device increases the filtering bandwidth of the first wavelength channel and decreases the filtering bandwidth of the second wavelength channel.

12. The device according to claim 10, wherein,
the adjustment unit is configured to: when the comparison result of the first comparison unit is that the modulation bandwidth of the first optical signal is greater than the modulation bandwidth of the second optical signal and the comparison result of the second comparison unit is that the transmission performance requirement of the first optical signal is higher than the transmission performance requirement of the second optical signal, control the optical device so that the optical device increases the filtering bandwidth of the first wavelength channel and decreases the filtering bandwidth of the second wavelength channel.

13. The device according to claim 11, wherein
the adjusted filtering bandwidth of the first wavelength channel and the adjusted filtering bandwidth of the second wavelength channel are capable of enabling an overall performance index y of the first wavelength channel and the second wavelength channel to be a maximum or greater than a predetermined value, and the overall performance index $$y = \sum_{i=1}^{N} B_i \times L_i,$$

wherein i is from 1 to 2, $B_1$ and $B_2$ are bit rates or baud rates of the first optical signal and the second optical signal respectively, $L_1$ is a transmission distance that the first optical signal is able to reach after being output through an adjusted first wavelength channel, and $L_2$ is a transmission distance that the second optical signal is able to reach after being output through an adjusted second wavelength channel; or, $L_1$ is the number of transmission spans that the first optical signal is able to reach after being output through the adjusted first wavelength channel, and $L_2$ is the number of transmission spans that the second optical signal is able to reach after being output through the adjusted second wavelength channel.

14. The device according to claim 12, wherein
the adjusted filtering bandwidth of the first wavelength channel and the adjusted filtering bandwidth of the second wavelength channel are capable of enabling an overall performance index y of the first wavelength channel and the second wavelength channel to be a maximum or greater than a predetermined value, and the overall performance index $$y = \sum_{i=1}^{N} B_i \times L_i,$$

wherein i is from 1 to 2, $B_1$ and $B_2$ are bit rates or baud rates of the first optical signal and the second optical signal respectively, $L_1$ is a transmission distance that the first optical signal is able to reach after being output through an adjusted first wavelength channel, and $L_2$ is a transmission distance that the second optical signal is able to reach after being output through an adjusted second wavelength channel; or, $L_1$ is the number of transmission spans that the first optical signal is able to reach after being output through the adjusted first wavelength channel, and $L_2$ is the number of transmission spans that the second optical signal is able to reach after being output through the adjusted second wavelength channel.

* * * * *